July 19, 1966  S. RIGG ETAL  3,261,648
BEARING ASSEMBLIES

Filed Dec. 17, 1962  3 Sheets-Sheet 3

INVENTORS
SHEPHERD RIGG
JAMES ROSTRON WRIGHT

BY *Larson and Taylor*

ATTORNEYS

United States Patent Office 3,261,648
Patented July 19, 1966

3,261,648
BEARING ASSEMBLIES
Shepherd Rigg, Appleton, Warrington, and James Rostron Wright, Culcheth, near Warrington, England, assignors to United Kingdom Atomic Energy Authority, London, England
Filed Dec. 17, 1962, Ser. No. 245,231
Claims priority, application Great Britain, Dec. 21, 1961, 45,959/61
3 Claims. (Cl. 308—121)

This invention relates to bearing assemblies of the kind comprising a rotatable member and a stationary member designed for operation with gas lubrication between the members.

The use of such an assembly involves maintaining a very small clearance between the members.

According to the invention a bearing assembly comprising a rotatable member and a stationary member designed for operation with gas lubrication between the members is provided with thermal control means for so controlling the temperature of one of the members relative to the temperature of the other member that an acceptable clearance is maintained between the members.

By way of example embodiments of the invention will now be described with reference to the accompanying drawings in which.

Figure 1:
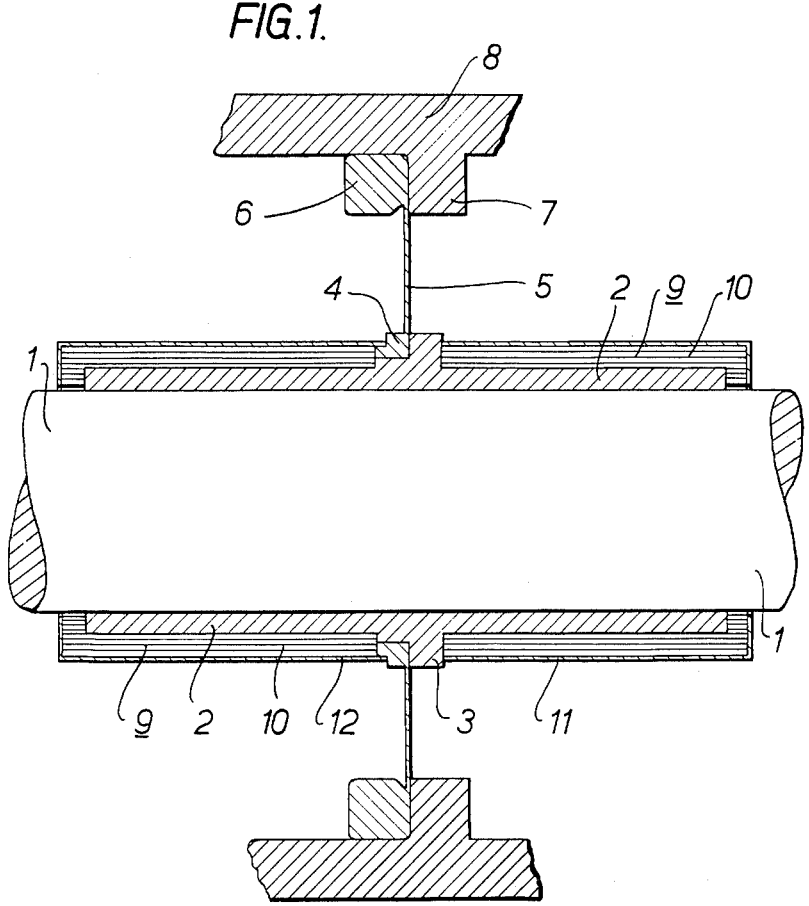
FIG. 1 is a sectional elevation of a bearing assembly.
Figure 3:
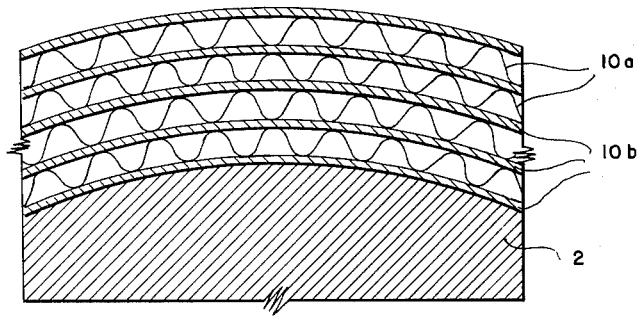
FIG. 3 is an enlarged partial sectional view of FIG. 1.

FIG. 1 shows a bearing assembly having a rotatable member in the form of a solid shaft 1 and a stationary (non-rotatable) member in the form of a cylindrical sleeve 2 disposed around the shaft 1. The sleeve 2 has a central outer annular flange 3 to which is secured by bolts an inner ring 4 of an annular supporting diaphragm 5. The diaphragm 5 has an outer ring 6 secured by bolts to a flange 7 on a housing 8. The assembly is provided with thermal control means for controlling the temperature of the sleeve 2 relative to the temperature of the shaft 1, said means being in the form of heat insulating material 9 extending over the external surface of the sleeve 2. The heat insulating material 9 is of laminated form comprising layers 10 of expanded metal and foil or dimpled metal and foil. FIG. 3 shows layers of expanded or dimpled metal 10a and interposed foil 10b. Retaining covers 11, 12 are provided for the heat insulating material 9, the covers 11, 12 being secured to the flange 3 and ring 4 respectively.

The size and surface finish of the bearing surfaces of the shaft 1 and sleeve 2 are such as to sustain gas lubrication, the diametral clearance between the bearing surfaces of the shaft 1 and sleeve 2 being typically one thousandth of an inch for a diameter of the shaft 1 of two inches. One rotation of the shaft 1 ambient gas is drawn into this clearance to form a gas lubricating film between the shaft 1 and the sleeve 2. When the shaft 1 carries a component subjected to high temperature, such as for example when the shaft 1 forms part of a compressor pumping gas at high temperature (e.g. 500° C.) and carries an impeller and an electrical rotor, the temperature of the shaft 1 rises and the heat insulating material 9 controls the temperature of the sleeve 2 relative to the temperature of the shaft 1 in a manner such that an acceptable clearance is maintained between the shaft 1 and the sleeve 2. Without the heat insulating material 9 there is the risk that the heat dissipation from the outer surface of the sleeve 2 might be such that the shaft 1 takes up the clearance, thereby giving rise to rubbing or seizure between the shaft 1 and the sleeve 2. The heat insulating material 9 covers the ends of the sleeve 2 thus avoiding preferential cooling of the ends by the gas carried around by the rotating shaft 1 which might otherwise give rise to rubbing between the shaft 1 and the ends of the sleeve 2.

Typically for a shaft diameter of two inches an acceptable diametral clearance lies in the range of eight to twelve ten thousandths of an inch, rubbing tending to occur below the lower limit and loss of gas lubrication tending to occur above the upper limit.

Figure 2:
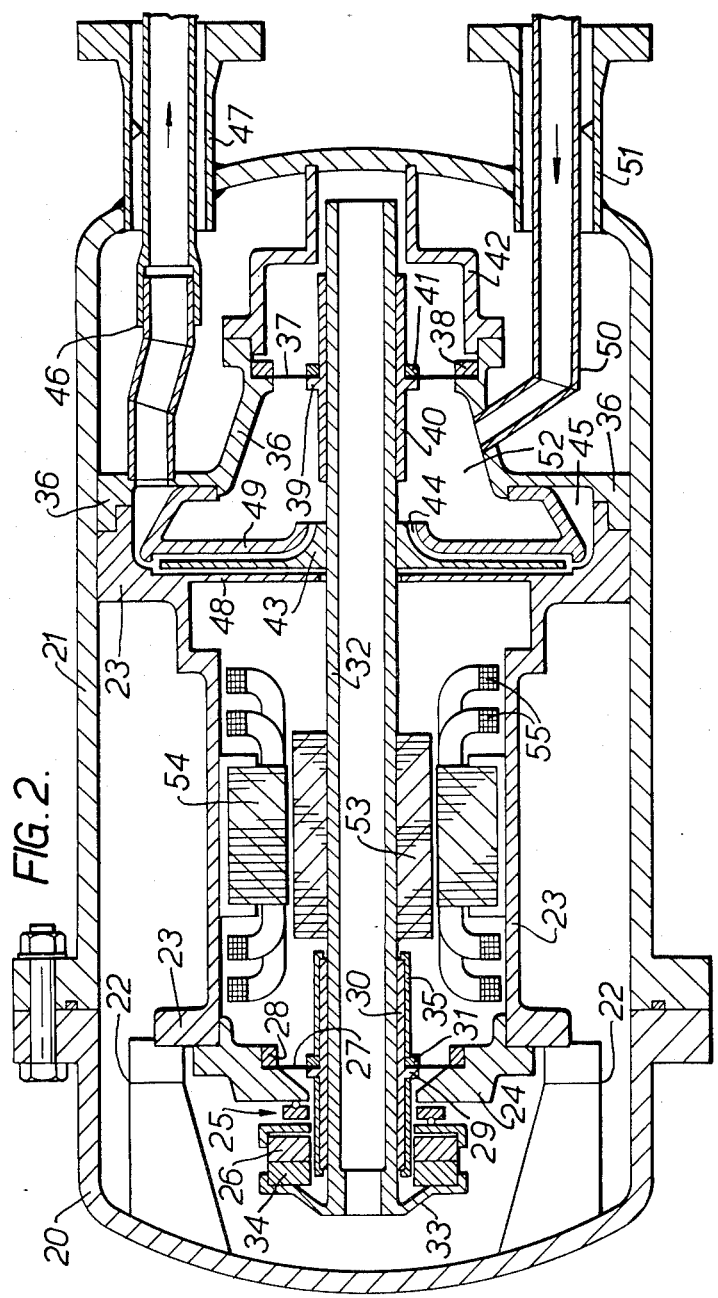
FIG. 2 is a part-diagrammatic sectional elevation of a compressor.

FIG. 2 shows a compressor comprising a casing in two parts 20, 21 sealed together at their flanged end faces. The part 20 carries internally a pedestal 22 to which one end of a flanged sleeve 23 is secured by bolts, the other end of the sleeve 23 being mounted from the part 21. Secured by bolts to the sleeve 23 is a flanged mounting ring 24 supporting a gimbal arrangement 25 having a non-rotating spirally grooved annular plate 26. An annular diaphragm 27 is secured at its outer periphery to the ring 24 by a bolted ring 28, and at its inner periphery to a central outer flange 29 on a cylindrical bearing sleeve 30 by a bolted ring 31. The sleeve 30 is disposed around one end of a tubular rotatable shaft 32 which has a flange 33 carrying a rotatable annular plate 34 adjacent the plate 26, the plates 26, 34 forming a thrust bearing. The external surface of the sleeve 30 has a covering of heat insulating material 35. Secured to the sleeve 23 by bolts and to the part 21 is a flanged mounting ring 36, and an annular diaphragm 37 is secured at its outer periphery to the ring 36 by a bolted ring 38. At its inner periphery the diaphragm 37 is secured to a central outer flange 39 on a cylindrical bearing sleeve 40 by a bolted ring 41, the sleeve 40 being disposed around the other end of the shaft 32. A flanged support sleeve 42 is secured at one end to the ring 36 and at the other to the part 21. The shaft 32 has secured to it a bladed impeller 43 having a central eye 44 and an annular outlet passage 45 communicating with an outlet pipe 46 passing through a flanged locating tube 47 penetrating and sealed to the part 21. An annular plate 48 on the sleeve 23 and an annular shroud 49 carried by bolts to the ring 36 form a housing for the impeller 43, and an inlet pipe 50 passing through a locating tube 51 penetrating and sealed to the part 21 communicates with an annular space 52 leading to the eye 44. Also secured to the shaft 32 is an electrical rotor 53 having its associated energising stator 54 and windings 55 supported from the sleeve 23.

The heat insulating material 35 is conveniently of the same form as the heat insulating material 9 described with reference to FIG. 1. The shaft 32 is supported at its ends by the bearing sleeves 30, 40 and carries the impeller 43 and rotor 53 between the sleeves 30, 40, the impeller 43 being adjacent the sleeve 40 and the rotor 53 being adjacent to the sleeve 30.

The size and surface finish of the bearing surfaces of the shaft 32 and sleeves 30, 40 are such as to sustain gas lubrication, the diametral clearance between the bearing surfaces of the shaft 32 and sleeves 30, 40 being typically one thousandth of an inch for an outer diameter of the shaft 32 of two inches.

In use of the compressor for pumping gas at high temperature (e.g. 500° C.), rotation of the shaft 32 draws ambient gas inside the casing into the clearances between the bearing surfaces of the shaft 32 and sleeves 30, 40 to form gas lubricating films between the shaft 32 and sleeves 30, 40 respectively. The high temperature gas enters the eye 44 by way of the pipe 50 and space 52 and is pumped by the rotating impeller 43 to the passage 45 and thence flows to the pipe 46.

Heat from the impeller 43 and from the rotor 53 flows along the shaft 32 to that end supported in the sleeve 30 so that the temperature of this end of the shaft 32 rises. The heat insulating material 35 controls the temperature of the sleeve 30 relative to that of the adjacent end portion of the shaft 32 in a manner such that an acceptable clearance is maintained between the bearing surfaces of the shaft 32 and sleeve 30. Without the heat insulating material 35 there is the risk that the heat dissipation from the outer surface of the sleeve 30 might be such that the adjacent end of the shaft 32 takes up the clearance, thereby giving rise to rubbing or seizure between the shaft 32 and the sleeve 30.

The use of laminated expanded or dimpled metal and foil is advantageous in that the heat insulating material 9 or 35 is then light in weight thus helping to keep the transverse moment of inertia of the sleeve 2 or 30 low, and is also unlikely to flake or break thus helping to avoid introduction of particles of foreign matter into the clearance between the shaft and the bearing sleeve. The heat insulating material may extend over a part only of the external surface of the bearing sleeve.

The shaft and the bearing sleeve or sleeves are made of materials of matched coefficients of thermal expansion.

The invention is not limited to thermal control means in the form of heat insulating material. In one alternative a baffle may be provided round the sleeve 2 to reduce heat dissipation from the sleeve 2. In another alternative a heating coil is provided round the sleeve 2, the coil output being controlled by way of capacity probes inserted in the sleeve 2 to measure the clearance between the shaft 1 and the sleeve 2.

The invention is also applicable to thrust bearings of the kind having a rotatable plate and a stationary plate, the opposed surfaces of the plates being operatively separated by a narrow clearance in which a gas lubricating film is sustained. Thus the plate 26 of the thrust bearing of FIG. 2 may be provided with heat insulating material, the spiral grooves of the plate 26 giving a pumping effect when the plate 34 rotates thereby creating a gas lubricating film between the plates.

We claim:
1. A bearing assembly comprising a rotatable shaft and a sleeve bearing disposed around the shaft, the shaft and bearing having bearing surfaces operatively separated by a narrow clearance, a gas lubricating film sustained within said clearance, a covering of heat insulating material extending contiguously over the external surface of the sleeve bearing for controlling the temperature of the sleeve bearing relative to the temperature of the shaft, thereby to maintain said narrow clearance.

2. A bearing assembly comprising a rotatable shaft and a sleeve bearing disposed around the shaft, the opposing surfaces of said shaft and said bearing being operatively separated by a narrow clearance, a gas lubricant sustained within said clearance, and means for maintaining said clearance, said means comprising a covering of heat insulating material extending contiguously over the external surface of said sleeve bearing, said heat insulating material being of laminated form comprising spaced layers of metal foil.

3. A bearing assembly according to claim 2 wherein said bearing assembly further comprises a retaining cover for the heat insulating material.

References Cited by the Examiner

UNITED STATES PATENTS

| | | | |
|---|---|---|---|
| 2,001,632 | 5/1935 | Schlichting | 29—455 |
| 2,173,225 | 9/1939 | Berry et al. | 308—77 |
| 2,184,197 | 12/1939 | Schutte | 308—77 |
| 2,451,124 | 10/1948 | Smith | 308—77 |
| 2,518,597 | 8/1950 | Brooks | 103—87 |
| 2,864,552 | 12/1958 | Anderson | 230—116 |
| 2,915,342 | 12/1959 | Keefer | 308—77 |
| 3,035,875 | 5/1962 | Bell | 308—77 |
| 3,107,498 | 10/1963 | Messer | 220—9 |

FRANK SUSKO, *Primary Examiner.*

ROBERT M. WALKER, *Examiner.*